US008417128B2

United States Patent
Naito

(10) Patent No.: US 8,417,128 B2
(45) Date of Patent: Apr. 9, 2013

(54) MONITORING APPARATUS AND METHOD FOR MONITORING AN IMAGE FORMING APPARATUS

(75) Inventor: Yoshiko Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 12/841,041

(22) Filed: Jul. 21, 2010

(65) Prior Publication Data

US 2011/0026942 A1    Feb. 3, 2011

(30) Foreign Application Priority Data

Jul. 28, 2009    (JP) .................................. 2009-175394

(51) Int. Cl.
    *G03G 15/00*    (2006.01)
(52) U.S. Cl.
    USPC ............................................................ 399/8
(58) Field of Classification Search ................ 399/8, 10; 702/186
    See application file for complete search history.

(56) References Cited

U.S. PATENT DOCUMENTS 6,615,161 B1 *  9/2003  Carney et al. ................. 702/186
2007/0273922 A1 * 11/2007  Matsugashita ............... 358/1.15

FOREIGN PATENT DOCUMENTS

| JP | 2001282471 A |   | 10/2001 |
| JP | 2003108332 A | * | 4/2003  |
| JP | 2008059471 A | * | 3/2008  |

* cited by examiner

*Primary Examiner* — Quana M Grainger
(74) *Attorney, Agent, or Firm* — Canon U.S.A., Inc. IP Division

(57)    ABSTRACT

A monitoring apparatus receives, according to an occurrence of an event (e.g., error or jam) at an image forming apparatus, a notification of information regarding the event that has occurred. The notification is sent with use of address information of the monitoring apparatus registered in the image forming apparatus. The monitoring apparatus stores the received information in a memory unit thereof. Then, the monitoring apparatus acquires the information regarding the event that has occurred at the image forming apparatus by periodically inquiring to the image forming apparatus, and determines whether the acquired information is stored in the memory unit. According to determination that the acquired information is not stored in the memory unit, the monitoring apparatus re-registers the address information of the monitoring apparatus into the image forming apparatus.

17 Claims, 15 Drawing Sheets

FIG.6

| DEVICE ID | DATE AND TIME OF DATA ACQUISITION | DATA ACQUISITION METHOD | EVENT KIND | DATE AND TIME OF EVENT OCCURRENCE | DETAILS OF EVENT |
|---|---|---|---|---|---|
| ABC00001 | 2009/05/20 09:10:30 | EVENT | ERROR | 2009/05/20 09:10:30 | E010,1245··· |
| XYZ1214 | 2009/05/21 19:40:50 | POLLING | JAM | 2009/05/21 19:40:44 | J005,2089··· |

FIG.7

```xml
<?xml version='1.0' encoding='UTF-8'?>
<SOAP-ENV:Envelope xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">

<SOAP-ENV:Body>

<nsl:postErrorInformation xmlns:nsl="server"SOAP-ENV:encodingStyle="http://schemas.xmlsoap.org/soap/encoding/">

<device xsi:type="ns2:deviceIdentityType"
xmlns:ns2="http://www.xxxx.com/ns/maintenance">

<serialNumber xsi:typ="xsd:string">ABC00001</serialNumber>

<errorCode xsi:type="xsd:string">E010</errorCode>

<occurenceTime xsi:type="xsd:dateTime">

05-20-2009T09:10:30.000Z

</occurenceTime>

<totalCounter xsi:type="xsd:long">1245</totalCounter>
</device>
<timeStamp xsi:type="xsd:dateTime">

05-20-2009T09:10:32.000Z

</timeStamp>
</nsl:postErrorInformation>
</SOAP-ENV:Body>
</SOAP-ENV:Envelope>
```

FIG.8

| Protocol Type=UDP/IP |
|---|
| IP Address=10.1.2.5 |
| Event Number=3 |
| Event Kind=error |
| Event Kind=jam |
| Event Kind=status |

MONITORING APPARATUS AND METHOD FOR MONITORING AN IMAGE FORMING APPARATUS

BACKGROUND OF THE INVENTION

1. Field of the Invention

The present invention relates to a system for monitoring. In particular, the present invention relates to registration of a notification destination at an event occurrence into an image forming apparatus.

2. Description of the Related Art

Conventionally, there has been known a monitoring system for collecting status information of an image forming apparatus connected to a network, such as failure information indicating a failure or abnormality such as a paper jam, and remaining amount information indicating, for example, a change in the remaining amount of consumables.

The monitoring system includes a monitoring apparatus connected to a network at a customer's office where the image forming apparatus is installed, and a management server remotely providing a central control of the image forming apparatus and the monitoring apparatus. The monitoring apparatus collects, for example, the status information from the image forming apparatus, and then notifies the management server of the collected information.

The above-mentioned status information includes event data indicating an occurrence of an event required to be maintained by, mainly maintenance staff of the image forming apparatus. This event data should be notified to the management server immediately after the event occurrence, to minimize the downtime (out-of-service time) of the image forming apparatus.

Therefore, the monitoring apparatus registers, for example, the network address (notification destination address) of the monitoring apparatus and the notification condition(s) into the image forming apparatus, and makes the image forming apparatus notify the monitoring apparatus of event data at the time of an occurrence of an event so that the monitoring apparatus can immediately recognize the occurrence of the event that is required to be maintained. Here, examples of the notification condition include a condition such that, when the image forming apparatus enters in a specific status, this status change should be notified.

However, relying solely on unilateral notification from the image forming apparatus as a means for conveying the status information of the image forming apparatus may result in undermining of the integrity of the information that the monitoring apparatus should keep monitoring, since the image forming apparatus may fail to notify the monitoring apparatus sometimes due to the communication status when the image forming apparatus tries to communicate, or some abnormality. Therefore, it is required that the monitoring apparatus periodically performs the processing of acquiring the status information from the image forming apparatus (polling processing).

On the other hand, for example, the above-mentioned registration information for a notification (address information of the notification destination and notification condition(s)) which is registered in the image forming apparatus may be lost due to, for example, power-off of the image forming apparatus. In association with a loss of the registration information, "Japanese Patent Application Laid-Open No. 2001-282471" discusses the following invention. That is, a printing apparatus is configured to delete address information of a host computer for a status notification which is registered in the printing apparatus but has been unused for a while, and the printing apparatus notifies the host computer of this deletion. The host computer re-registers the address only when it receives such a notification.

However, in "Japanese Patent Application Laid-Open No. 2001-282471", the printing apparatus distinguishes an address that has been unused for a while, and sends a notification when the printing apparatus deletes this address. Therefore, any measure is not taken against a loss of a notification destination due to power-off or overwriting of other information thereon. Further, in the conventional art, communication should be performed only for the purpose of a notification of deletion of an address, besides a notification of the status of the printing apparatus. In this way, this conventional art leaves much to be improved.

SUMMARY OF THE INVENTION

According to an aspect of the present invention, a monitoring apparatus for monitoring an image forming apparatus, includes a memory device, a registration unit configured to register address information of the monitoring apparatus into the image forming apparatus, a reception unit configured to, according to an occurrence of an event at the image forming apparatus, receive from the image forming apparatus a notification of information regarding the event that has occurred, the notification being sent using the registered address information, a storing unit configured to store the information regarding the event that has occurred at the image forming apparatus in the memory device based on the received notification, an acquisition unit configured to acquire the information by periodically inquiring to the image forming apparatus, and a determination unit configured to determine whether the acquired information is stored in the memory device, wherein, if the information is not stored in the memory device, the registration unit re-registers the address information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of status information stored in the monitoring apparatus 101.

FIG. 7 illustrates an example of data that the monitoring apparatus 101 notifies a management server.

FIG. 8 illustrates an example of registration information for a notification of the status information, which is registered in the image forming apparatus.

DESCRIPTION OF THE EMBODIMENTS

Various exemplary embodiments, features, and aspects of the invention will be described in detail below with reference to the drawings.

Figure 1:
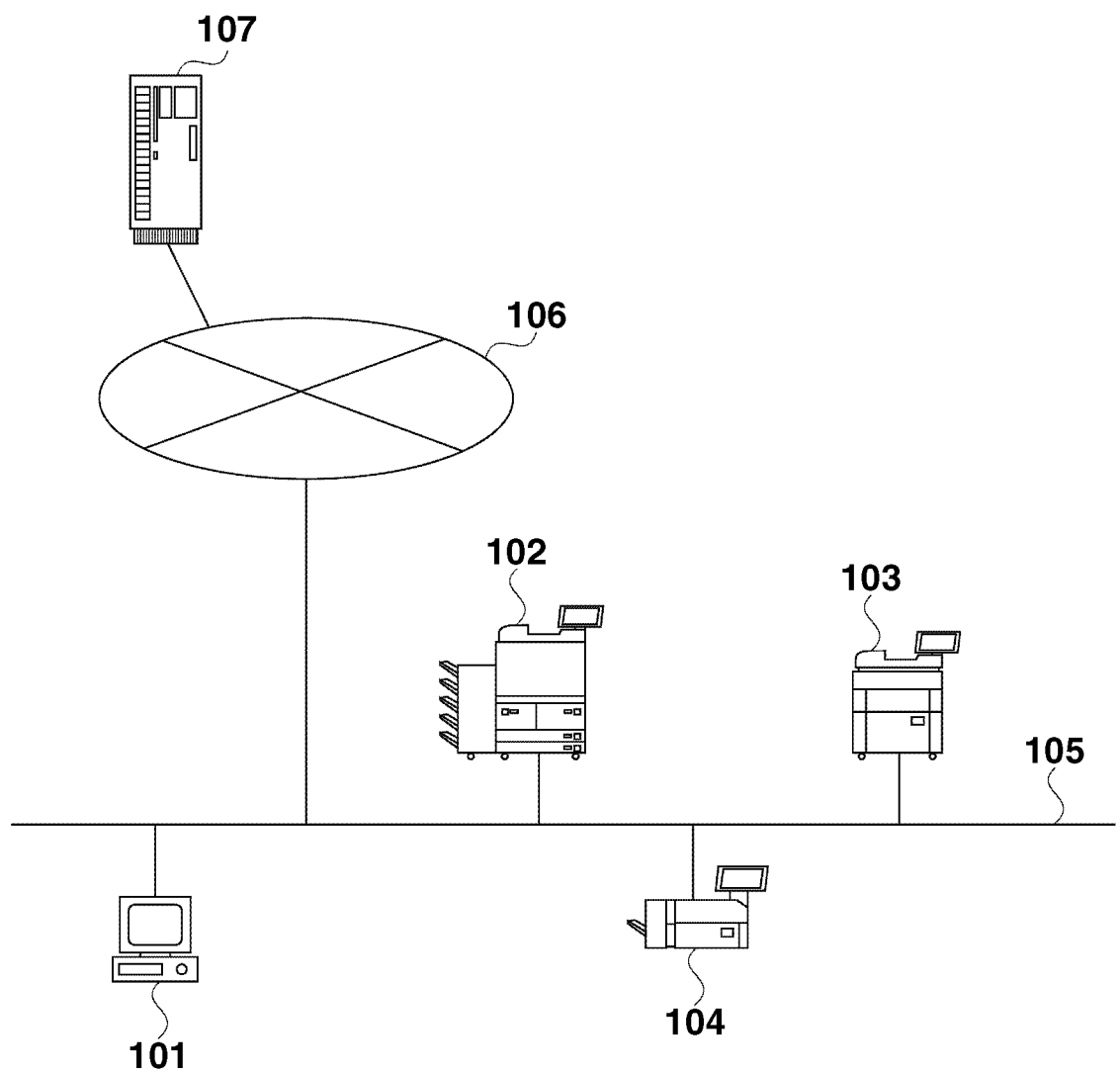
FIG. 1 illustrates an example of a configuration of a system according to an exemplary embodiment of the present invention.

FIG. 1 is a diagram illustrating the system configuration of a system including an apparatus according to a first exemplary embodiment of the present invention. The system illustrated in FIG. 1 includes a monitoring apparatus 101, and image forming apparatuses 102, 103, and 104 installed at, for example, a customer's office and required to be monitored. The monitoring apparatus 101 and the image forming apparatuses 102, 103, and 104 belong to a same local system, and the monitoring apparatus 101 serves to monitor the image forming apparatuses 102, 103, and 104. Examples of the image forming apparatus include a printer, a copying machine, and a complex machine. The processing according to exemplary embodiments of the present invention, which will be described later, can be applied to any of these machines.

The monitoring apparatus 101 acquires operation information from the image forming apparatuses 102 to 104 via a network 105. Here, the operation information includes counter information indicating the number of printed sheets and the numbers of uses of the components, status information such as an error or a jam, and information of an environment log. The environment log is the log that periodically recorded a measured value measured in the imaging device, which the measured value includes the temperature and the humidity. The monitoring apparatus 101 transmits the information acquired from the image forming apparatuses 102 to 104 via an internet 106 to a management server 107, which remotely manages the information forming apparatuses 102 to 104.

Figure 2:
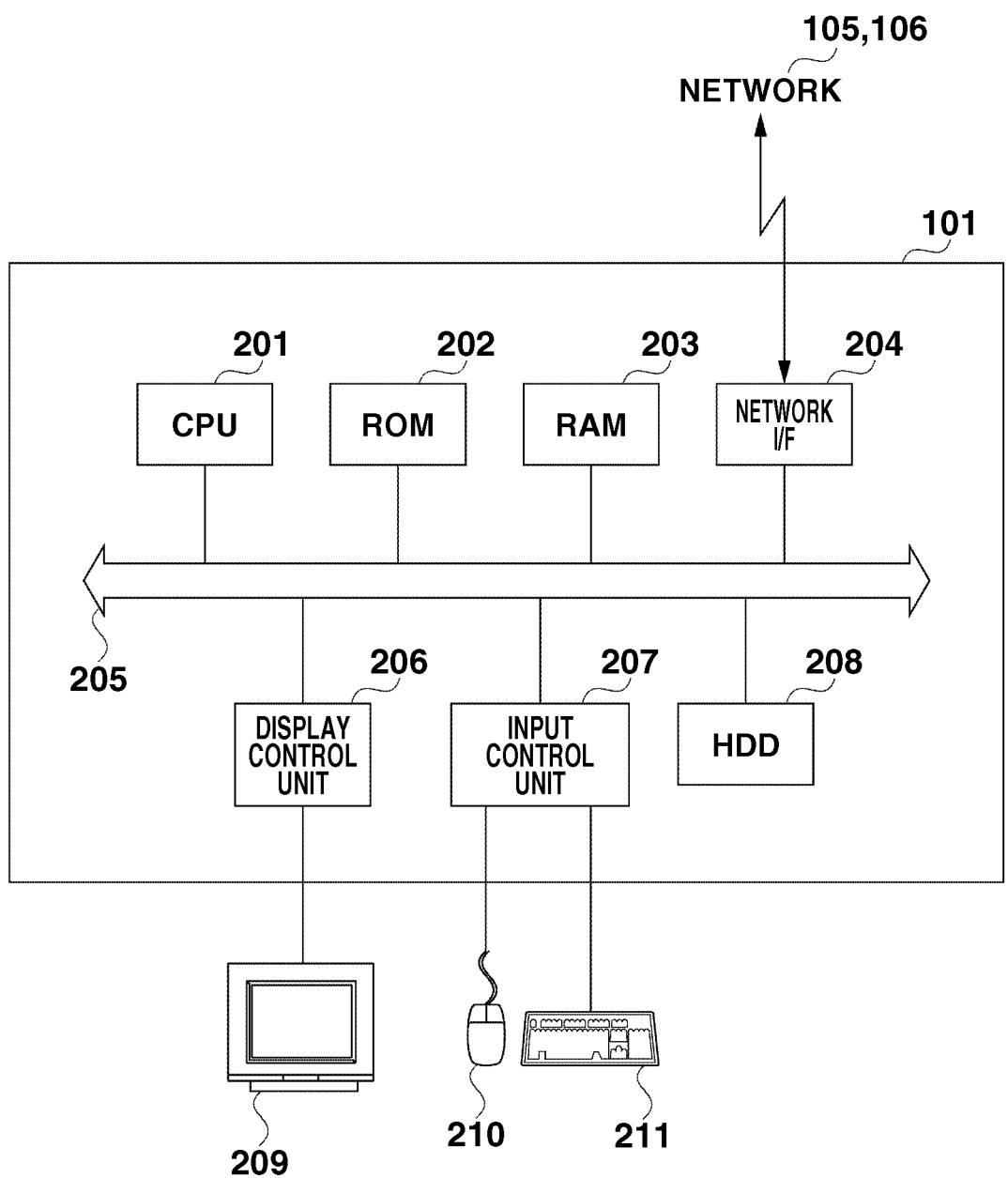
FIG. 2 illustrates an example of a hardware configuration of a monitoring apparatus 101 according to the exemplary embodiment of the present invention.

FIG. 2 is a diagram illustrating the hardware configuration of the monitoring apparatus 101.

A central processing unit (CPU) 201 provides an overall control of the monitoring apparatus 101. A read-only memory (ROM) 202 is a read-only memory for storing a boot program required for system activation, and various programs for enabling processing such as monitoring processing. A random access memory (RAM) 203 is used as, for example, a working memory required when the CPU 201 executes the programs.

A network interface 204 is a component enabling communication with the image forming apparatuses 102 to 104, and communication with the management server 107 via the internet 106. A display device 209 is connected to a display control unit 206, and input devices 210 and 211 are connected to an input control unit 207.

The information required for an operation of the system, including the information transmitted from the management server 107, is input and output through the input and output devices (209 to 211). A hard disk drive (HDD) 208 stores, for example, information of the programs and applications to be executed by the CPU 201. Further, the components described here are connected to a system bus 205.

Figure 3:
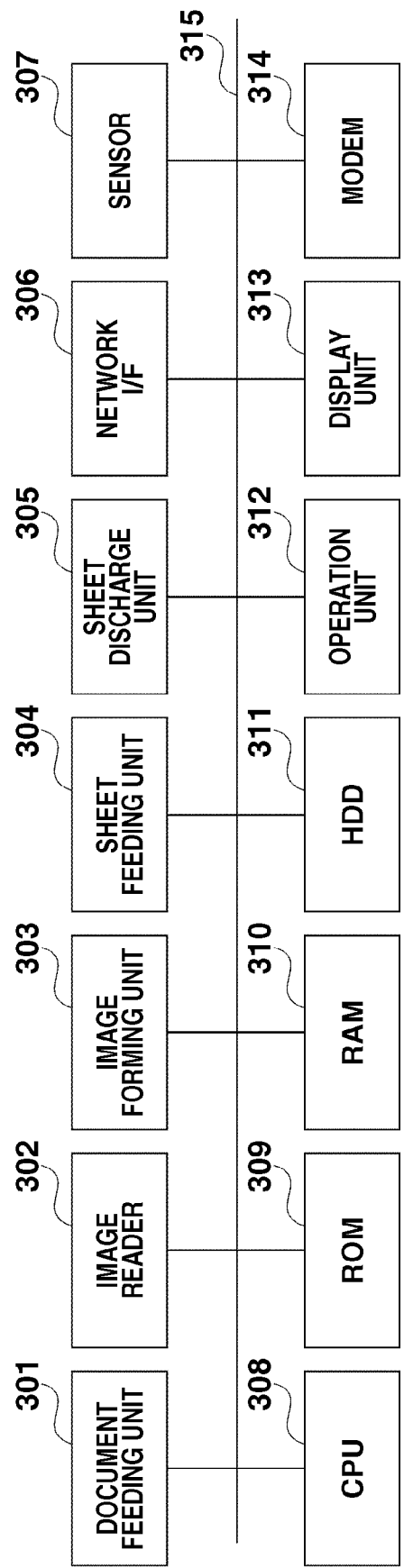
FIG. 3 illustrates an example of a hardware configuration of an image forming apparatus according to the exemplary embodiment of the present invention.

FIG. 3 is a diagram illustrating the hardware configuration of each of the image forming apparatuses 102 to 104, which are employed in the present exemplary embodiment.

A document feeding unit 301 automatically sends a document to an image reader 302. The sent document is then read in by the image reader (scanner) 302. An image forming unit 303 converts the read-in document and data received from, for example, the network into a print image, and then makes a print thereof. A sheet feeding unit 304 supplies a sheet on which the image is printed.

A sheet discharge unit 305 performs post-processing such as sorting and stapling of the printed sheets, and discharges them. A network interface 306 is connected to, for example, the local area network (LAN) and the internet for enabling communication with the outside of the image forming apparatus. A sensor 307 detects the statuses of the units of the image forming apparatus.

A central processing unit (CPU) 308 provides an overall control of the image forming apparatus. A read-only memory (ROM) 309 stores a boot program required for system activation, and various programs for enabling various kinds of processing. A random access memory (RAM) 310 is used as, for example, a working memory required when data is temporarily stored or when the CPU 308 executes a program. A hard disk drive (HDD) 311 stores, for example, programs and data related to the various kinds of processing, and user information transmitted to the image forming apparatus.

An operation unit 312 accepts an instruction input. A display unit 313 displays, for example, operation information of the image forming apparatus, and information regarding an operation performed at the operation unit 312. A modem 314 is connected to a connection line for enabling a connection to the outside of the image forming apparatus. A system bus 315 connects the above-mentioned components to one another.

Image forming apparatuses other than the image forming apparatus employed in the present exemplary embodiment may have, for example, an image reader 302, an image forming unit 303, and a modem 314 that function in different manners from the above-mentioned manners, or may not include any of these components, according to the function of that image forming apparatus. However, the characteristic processing in the present exemplary embodiment, which will be described later, can be also applied to such image forming apparatuses.

Figure 4:
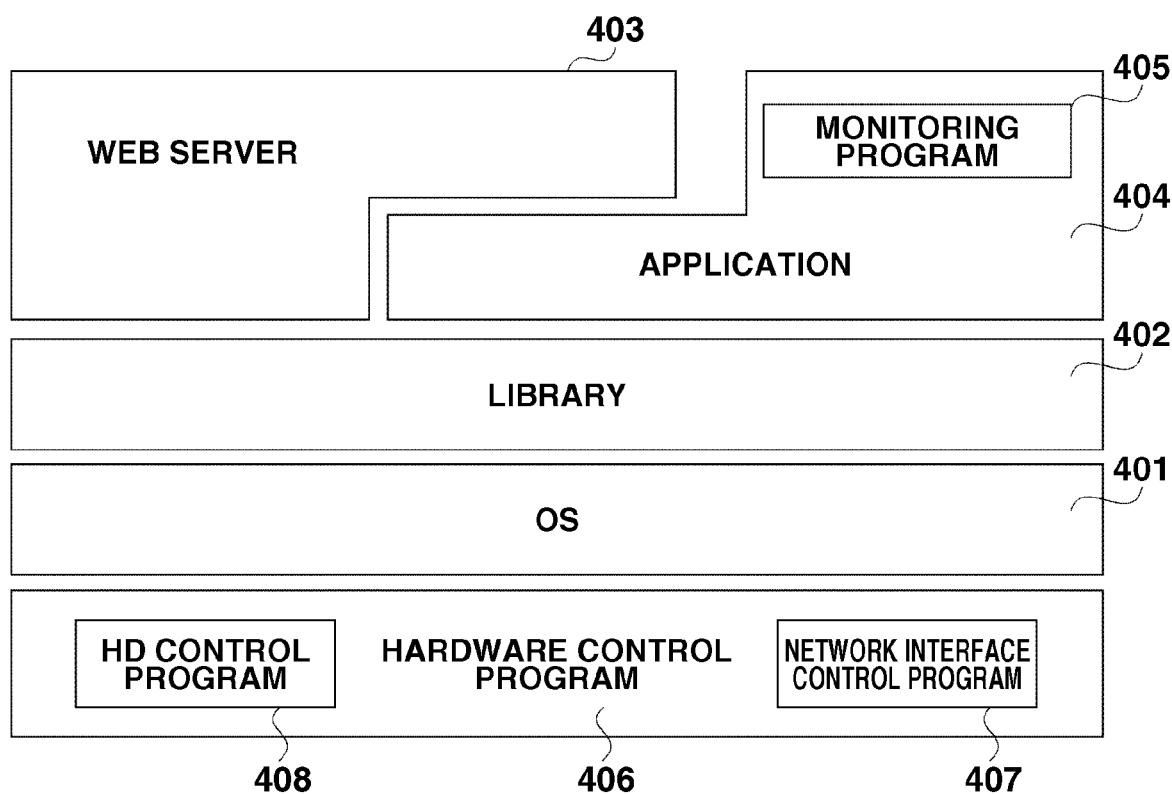
FIG. 4 illustrates an example of a software configuration of the monitoring apparatus 101 according to the exemplary embodiment of the present invention.

FIG. 4 is a block diagram illustrating software programs of the monitoring apparatus 101.

The monitoring apparatus 101 includes, as software programs thereof, an operating system (OS) 401, a library 402, a web server 403, and an application 404. The application 404 includes, as a part thereof, a monitoring program 405 for enabling management of the information regarding the image forming apparatuses 102 to 104 and a control according to the information transmitted from the management server 107. The monitoring apparatus 101 further includes a hardware control program 406. The hardware control program 406 include, as a part thereof, a network interface control program 407 and a hard disk (HD) control program 408.

Figure 5:
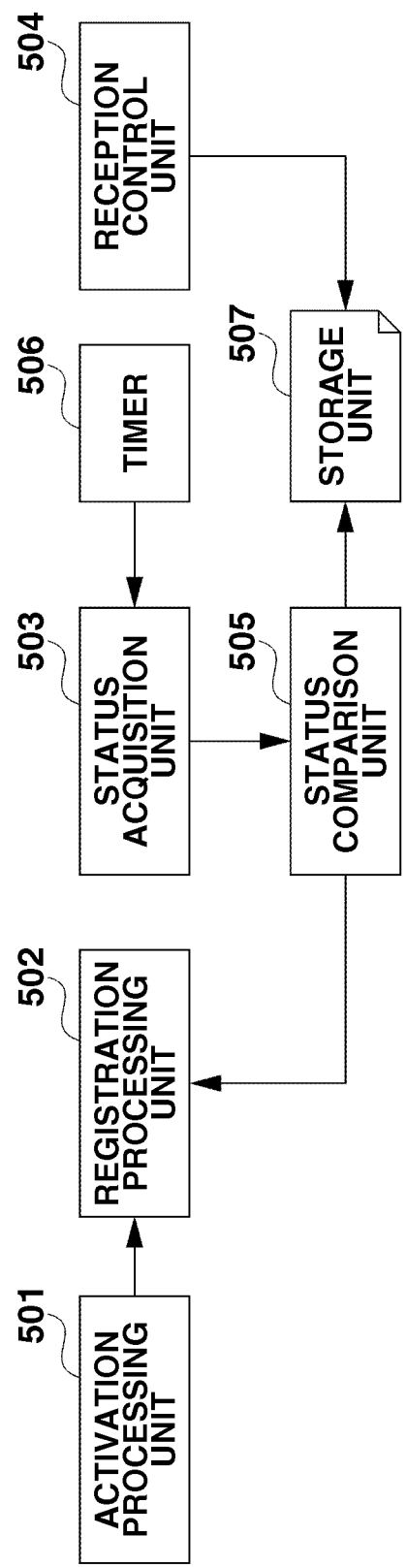
FIG. 5 illustrates association among modules of the monitoring apparatus 101 according to the exemplary embodiment of the present invention.

FIG. 5 is a block diagram illustrating association among modules of the monitoring apparatus 101.

An activation processing unit 501 controls activation processing of the monitoring program 405. The activation processing unit 501 invokes a registration processing unit 502. The registration processing unit 502 registers registration information, which is used in an information notification to the monitoring apparatus 101, into the image forming apparatuses 102 to 104. The registration information includes address information of the monitoring apparatus 101 that will become a notification destination, and notification condition(s).

A status acquisition unit 503 starts processing in response to a notification from a timer 506, acquires status information by requesting it to the image forming apparatuses 102 to 104, and invokes a status comparison unit 505. In other words, the processing of requesting the status information from the monitoring apparatus 101 to the image forming apparatuses 102 to 104 and acquiring the status information is realized by the status acquisition unit 503.

The status comparison unit 505 compares the status information acquired by the status acquisition unit 503 from the image forming apparatuses 102 to 104, with the status information stored in a storage unit 507. Then, if the status comparison unit 505 determines that some change occurs, the comparison unit 505 requests the registration processing unit 502 to register the registration information (notification destination address and notification condition(s)) into the image forming apparatuses 102 to 104.

A reception control unit 504 waits for a notification of the status information from the image forming apparatuses 102 to 104. The notification of the status information is spontaneously performed by the image forming apparatuses 102 to 104 based on the registration information registered in the image forming apparatuses 102 to 104. Upon receiving of the status information from the image forming apparatuses 102 to 104, the reception control unit 504 stores that information in the storage unit 507 which is embodied by the RAM 203 or HDD 208.

FIG. 6 illustrates an example of the status information that the monitoring apparatus 101 stores in the storage unit 507 after acquiring it from the image forming apparatuses 102 to 104.

Device ID is identification information for identifying the image forming apparatuses 102 to 104. Date and time of data acquisition is a date and time when the monitoring apparatus 101 acquires the information from the image forming apparatuses 102 to 104. Data acquisition method indicates a method by which the monitoring apparatus 101 acquires the data from the image forming apparatuses 102 to 104.

If the monitoring apparatus 101 acquires the status information through a spontaneous notification of the status information that the image forming apparatuses 102 to 104 perform according to the registration information, the term "event" is recorded in this item. If the monitoring apparatus 101 acquires the status information through information acquisition (polling) that the monitoring apparatus 101 periodically performs, the "polling" is recorded in this item.

Event kind indicates a type of an event that occurs at the image forming apparatuses 102 to 104 such as an error, a jam, and an alarm. Date and time of event occurrence indicates a date and time when the event occurs at the image forming apparatuses 102 to 104. Details of event vary depending on the event kind.

The item "details of event" will now be described by taking, as an example, the event that occurs at the image forming apparatus having a device ID of ABC00001. In this case, the type of event is error, and therefore the details of event include E010, which is an error code for identifying the error, and 1245, which is the total number of the printed sheets at the time of the occurrence of the event. Further, the details of event can include a detail code indicating the details of the error, and what kind of operation the image forming apparatus is performing at the time of the occurrence of the error, such as scanning.

FIG. 7 illustrates an example of data that the monitoring apparatus 101 notifies the management server 107 via the internet 106. The data illustrated in FIG. 7 is written in the simple object access protocol (SOAP) schema, but the format of the notification data is not limited thereto.

The data illustrated in FIG. 7 is a notification of the error that has occurred at the image forming apparatus having a device ID of ABC00001 illustrated in FIG. 6. The text "nsl:postErrorInformation" indicates that this notification data is error information. The device ID, which is identification information for identifying the image forming apparatus, is set to "serialNumber". In the example illustrated in FIG. 7, ABC00001 is set thereto. The error code E010 is set to "errorCode", the date and time of the error occurrence is set to "occurenceTime", and 1245, which is the number of the printed sheets at the time of the occurrence of the error, is set to "totalCounter". The date and time when the monitoring apparatus 101 transmits the data to the management server 107 is set to "timeStapm".

FIG. 8 illustrates an example of the registration information for a notification that the monitoring apparatus 101 registers in the image forming apparatuses 102 to 104.

"Protocol Type" is a protocol for use in a notification of an event from the image forming apparatuses 102 to 104 to the monitoring apparatus 101. "IP Address" is the address of a notification destination, i.e., the internet protocol (IP) address of the monitoring apparatus 101. "Event Number" is the number of events set as targets that should be notified. "Event Kind" is a type of an event set as a target that should be notified, and events corresponding to the number set to "Event Number" are set thereto. In the example illustrated in FIG. 8, error, jam, change in status are set to "Event Kind" as status information that should be notified, and therefore as notification conditions.

Figure 9:
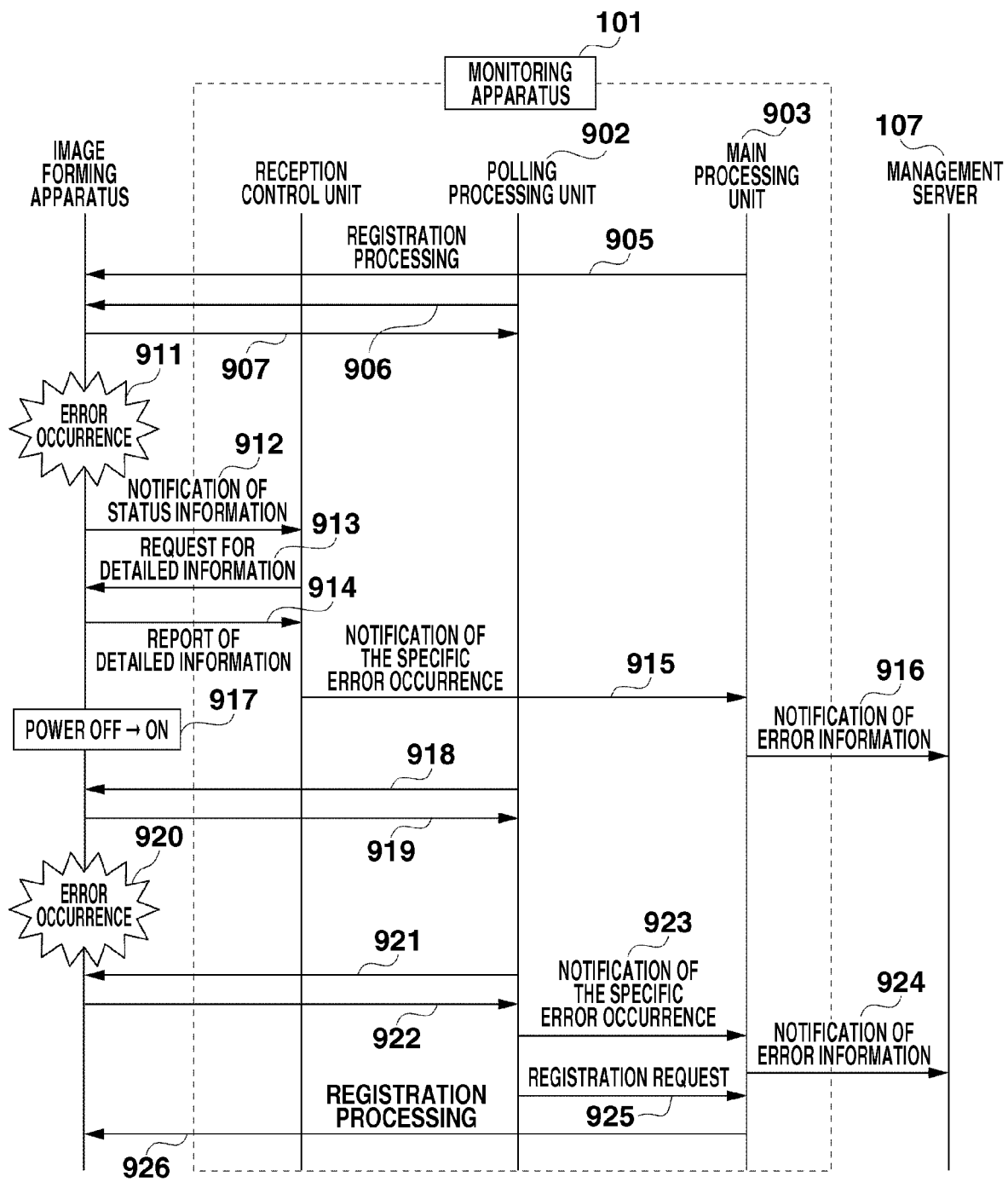
FIG. 9 is a sequence diagram illustrating overall processing according to the exemplary embodiment of the present invention.

FIG. 9 is a sequence diagram illustrating operations of the monitoring apparatus 101, the image forming apparatuses 102 to 104, and the management server 107 in the present exemplary embodiment. The processing of the reception control unit 504, the processing of a polling processing unit 902, and the processing of a main processing unit 903 are realized by an execution of the monitoring program 405 in the monitoring apparatus 101. The polling processing unit 902 is constituted by the status acquisition unit 503, the timer 506, and the status comparison unit 505. The main processing unit 903 is constituted by the activation processing unit 501 and the registration processing unit 502.

Hereinafter, an overview will be given of how the monitoring apparatus 101 functions in the system.

First, the main processing unit 903 invokes the registration processing unit 502 through the activation processing unit 501, and registers the registration information, which is used in a notification of the status information, into the image forming apparatus 102 (905). By this processing, the reception control unit 504 enters a standby status for reception of the status information.

On the other hand, the polling processing unit 902 initializes the timer 506 to start periodic processing thereof. The polling processing unit 902 inquires to the image forming apparatus 102 at a predetermined time interval through the status acquisition unit 503 about whether any event that should be notified to the management server 107 occurs (906, 907).

The image forming apparatus 102 saves the registration information (notification destination address and notification condition(s)) transmitted from the registration processing unit 502 in, for example, the RAM 310. When an error occurs (911), the image forming apparatus 102 refers to the registration information saved in the RAM 310, and if the apparatus 102 determines that the error that has occurred is an event that should be notified, notifies the reception control unit 504 in the monitoring apparatus 101 of the status information (912).

The reception control unit 504, upon reception of the notification of the status information, inquires to the image forming apparatus 102 about the details of the event that has occurred (913), and then receives the response thereto (914). After that, the reception control unit 504 notifies the main processing unit 903 of the received event and the detailed information thereof (915). The main processing unit 903 converts the received information about the event into data in the format illustrated in FIG. 7, and then transmits the converted data to the management server 107 (916).

Then, in the image forming apparatus 102, the registration information saved in the RAM 310 vanishes due to turning off and on of the image forming apparatus 102 (917).

After that, the polling processing unit 902 sends periodic inquiries about the status to the image forming apparatus 102 (918, 921). At the time of the first polling processing (918, 919), any event that should be notified (a change in status) has not occurred.

Assuming that an error occurs at the image forming apparatus 102 (920) after that, the polling processing unit 902 can acquire the specific event and the detailed information thereof (922) as a response to the second polling processing (921). Then, if the status comparison unit 505 determines that the status of the image forming apparatus 102 is different from what it was before, the polling processing unit 902 notifies the main processing unit 903 of the event that has occurred and the detailed data thereof (923). The main processing unit 903 converts the received information about the event into data in the format illustrated in FIG. 7, and transmits the converted data to the management server 107 (924).

At this time, the polling processing unit 902 determines that the registration information (notification destination address and notification condition(s)) registered in the image forming apparatus 102 has vanished, and then requests the main processing unit 903 through the status comparison unit 505 to perform the registration processing (925). This is because the event that the image forming apparatus 102 was supposed to notify spontaneously is acquired through the polling processing. The main processing unit 903 invokes the registration processing unit 502 through the activation processing unit 501, and registers the registration information, which is used in a notification of the status information, in the image forming apparatus 102 (926).

Hereinafter, operations of the main processing unit 903, the reception control unit 504, and the polling processing unit 902 will be described in further detail, with reference to the flowcharts illustrated in FIGS. 10 to 12.

Figure 10:
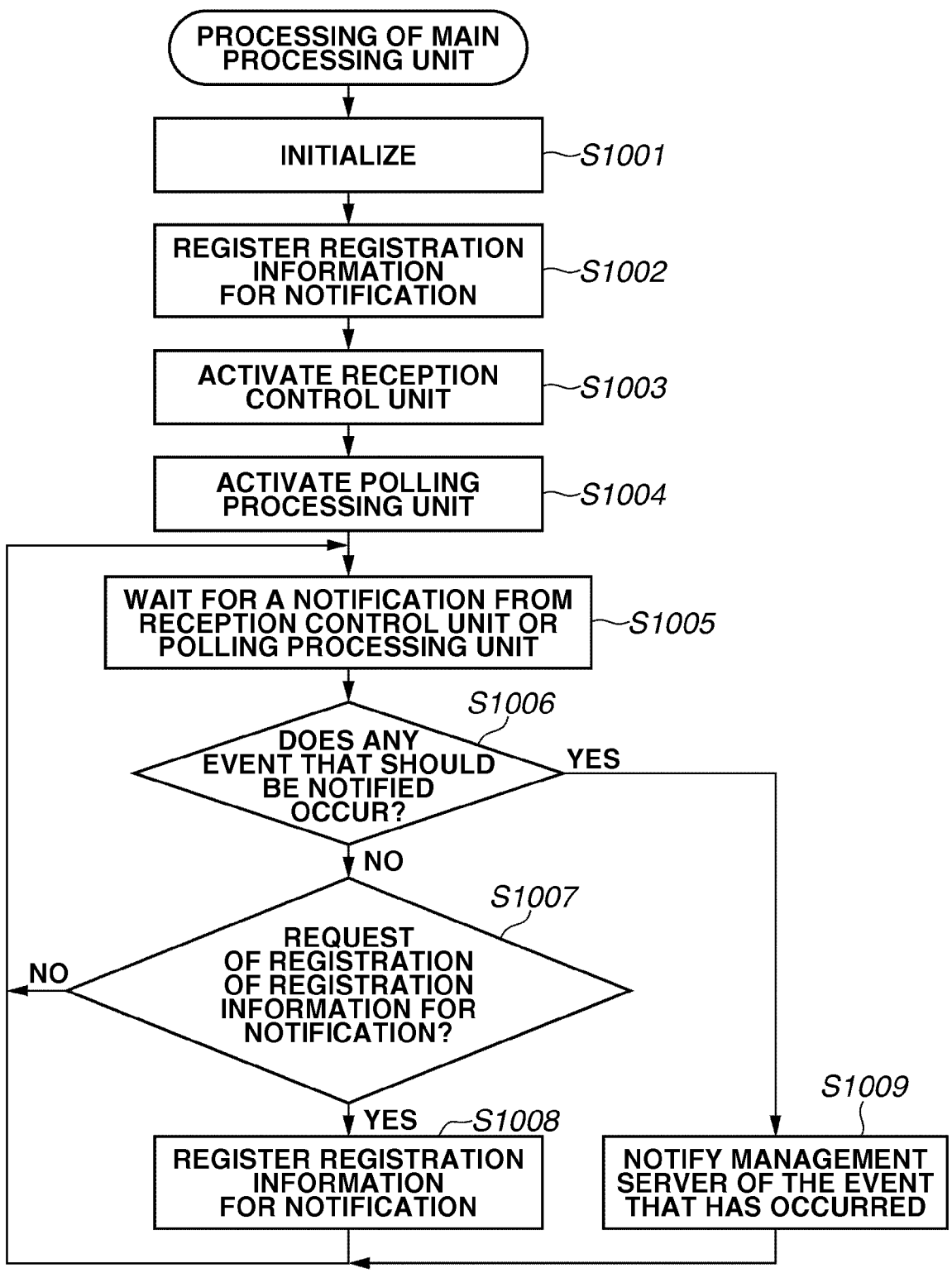
FIG. 10 is a flowchart illustrating processing of a main processing unit.

FIG. 10 is a flowchart illustrating the operation of the main processing unit 903.

In step S1001, the main processing unit 903, as initialization processing, reads the number of the image forming apparatuses monitored by the monitoring program 405 stored in the HDD 208, and the device IDs and the IP addresses of those image forming apparatuses, and then stores the read information in the RAM 203. This information may be registered by an administrator of the monitoring apparatus 101 in advance, or may be acquired from the management server 107 through a communication line such as the internet 106.

In step S1002, the main processing unit 903 creates, in the RAM 203, the registration information for a notification (notification destination address and notification condition(s)) in the format illustrated in FIG. 8 for one or more image forming apparatuses monitored by the monitoring apparatus 101. Then, the registration processing unit 502 performs the registration processing by transmitting the created information to the image forming apparatuses through the network 105.

In step 1003, the main processing unit 903 activates the reception control unit 504 as a thread or a process. Upon completion of the activation of the reception control unit 504, in step S1004, the main processing unit 903 activates the polling processing unit 902 as a thread or a process.

Next, in step S1005, the main processing unit 903 enters a standby status for reception of a notification from the reception control unit 504 and the polling processing unit 902. When the main processing unit 903 receives a notification after step S1005, the main processing unit 903 determines the type of the notified event in step S1006. That is, in step S1006, the main processing unit 903 determines whether the notification indicates an occurrence of an event that should be notified to the management server 107. If the main processing unit 903 determines that the notification indicates an occurrence of an event that should be notified to the management server 107 (YES in step S1006), then the processing proceeds to step S1009. In step S1009, the main processing unit 903 notifies the management server 107 of the event that has occurred, and then returns to a standby status of step S1005.

In step S1006, if the main processing unit 903 determines that the notification does not indicate an occurrence of an event that should be notified to the management server 107 (NO in step S1006), then the processing proceeds to step S1007. In step S1007, the main processing unit 903 further determines whether the notification is a request for the registration processing of the registration information (notification destination address and notification condition(s)). If the main processing unit 903 determines in step S1007 that the notification is a request for the registration processing (YES in step S1007), then the main processing unit 903 proceeds to step S1008. In step S1008, the main processing unit 903 creates the registration information as in step S1002 for the image forming apparatus of the IP address included in the request data, and transmits the created information to the image forming apparatus. On the other hand, if the main processing unit 903 determines in step S1007 that the notification is not a request for the registration processing, then the main processing unit 903 returns to a standby status in step S1005.

Figure 11:
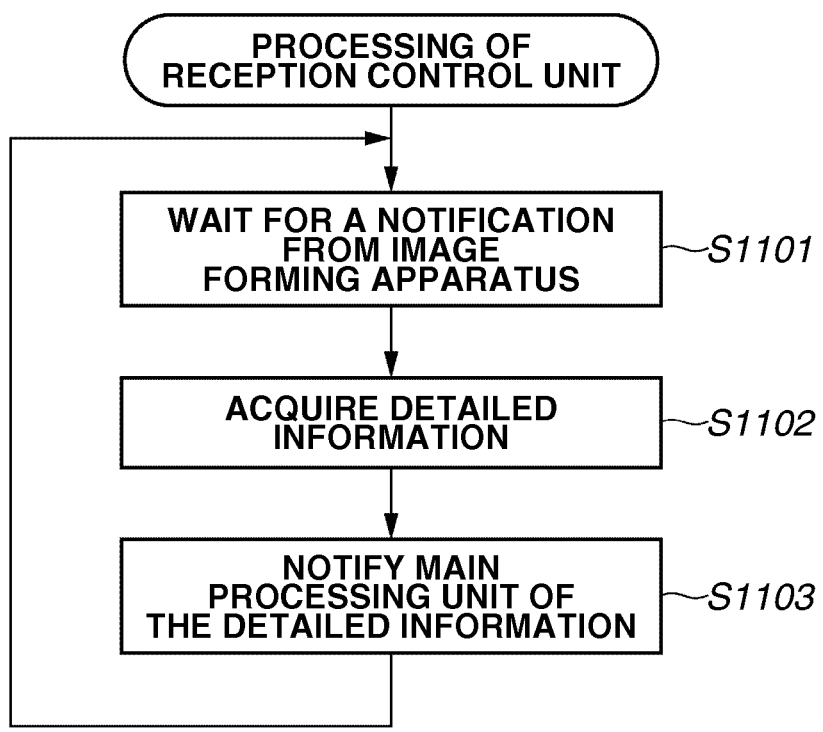
FIG. 11 is a flowchart illustrating processing of a reception control unit.

FIG. 11 is a flowchart illustrating the operation of the reception control unit 504.

The reception control unit 504 is activated by the main processing unit 903 in step S1003 of FIG. 10.

In step S1101, the reception control unit 504 enters a standby status for reception of a notification of the status information from the image forming apparatus. When the reception control unit 504 receives a notification of the status information, in step S1102, the unit 504 acquires, from the image forming apparatus, detailed information about the specific event included in the received notification that should be notified to the management server 107. At this time, the status that the image forming apparatus has already notified is managed in the monitoring apparatus 101, based on the status information and the detailed information thereof that the reception control unit 504 has received from the image forming apparatus.

Here, there are two ways that the image forming apparatus stores the status information. One way is to sequentially and additionally write and save notification contents in, for example, the HDD 311 thereof. The other way is to retain only the information of the current status. As in the former way, if the image forming apparatus stores a plurality of notification contents as the status information, the reception control unit 504, at the same time as receiving the status information from the image forming apparatus, receives read pointer information (first reference information), which indicates how far the monitoring apparatus 101 has read out the notification contents as of this time, and manages this information in the storage unit 507.

Alternatively, if the image forming apparatus retains the current status information, the reception control unit 504 stores the status information and the detailed information thereof received from the image forming apparatus in the storage unit 507. By this processing, the status that the image forming apparatus 102 has already notified can be managed in the monitoring apparatus 101.

After that, in step S1103, the reception control unit 504 notifies the main processing unit 903 of the received detailed information about the event, and returns to a standby status in step S1101.

Figure 12:
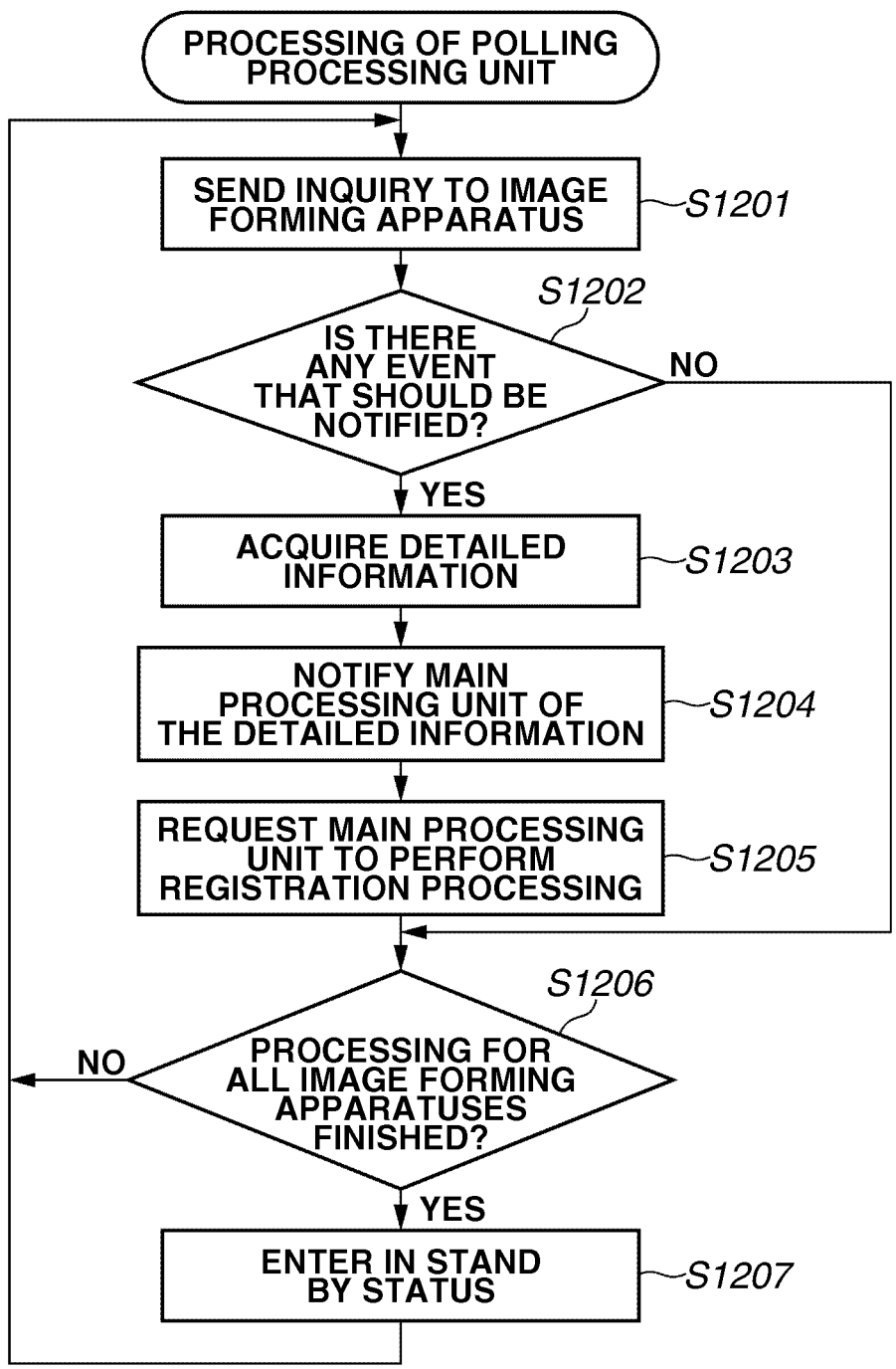
FIG. 12 is a flowchart illustrating processing of a polling processing unit.

FIG. 12 is a flowchart illustrating the operation of the polling processing unit 902.

The polling processing unit 902 is activated by the main processing unit 903 in S1004 of FIG. 10. The polling processing unit 902 periodically inquires to the image forming apparatus about whether any event that should be notified to the management server 107 occurs.

In step S1201, the polling processing unit 902 starts the processing of requesting the image forming apparatus to send the information required for determining whether any event that should be notified occurs based on a change in the status of the image forming apparatus. The processing performed at this time includes, for example, the communication start processing for enabling the polling processing.

In step S1202, the polling processing unit 902 determines whether there is any event that should be notified, based on the information acquired through the requesting processing performed in step S1201. If the polling processing unit 902 determines that there is an event that should be notified (YES in step S1202), then the processing proceeds to step S1203. If no event that should be notified occurs at the image forming apparatus (NO in step S1202), then the processing proceeds to step S1206.

Here, a description will be given of how to determine whether there is an event that should be notified. In the case where the monitoring apparatus 101 manages the read pointer information in the storage unit 507, the polling processing unit 902 acquires write pointer information (second reference information), which indicates how far the image forming apparatus has written the status information in the HDD 311 or another storage unit thereof until now, from the image forming apparatus. In other words, the write pointer information indicates the position of the most recently stored status information in the HDD 311 or the other storage unit.

Then, the polling processing unit 902 compares the acquired write pointer information with the read pointer information managed in the storage unit 507. If the write pointer is ahead of the read pointer, the polling processing unit 902 determines that there is a change in the status at the image forming apparatus. Otherwise, the polling processing unit 902 determines that there is no change in the status at the image forming apparatus.

On the other hand, in the case where the event at the image forming apparatus and the detailed information thereof are managed in the storage unit 507, the polling processing unit 902 compares the currently acquired information with the information managed in the storage unit 507. If this comparison results in a discrepancy therebetween, the polling processing unit 902 determines that there is a change in the status at the image forming apparatus. If there is no discrepancy therebetween, the polling processing unit 902 determines that there is no change in the status at the image forming apparatus. In this way, the polling processing unit 902 finds out whether there is any event that should be notified.

In step S1203, the polling processing unit 902 acquires the detailed information of the event that should be notified from the image forming apparatus, and then stores and manages the currently read pointer information or the acquired information about the event in the storage unit 507. In step S1204, the polling processing unit 902 notifies the main processing unit 903 of the acquired detailed information of the event that has occurred.

Further, in step S1205, the polling processing unit 902 requests the main processing unit 903 to register the registration information for a notification (notification destination address and notification condition(s)) into the image forming apparatus. At this time, the polling processing unit 902 transmits the identification information of the image forming apparatus such as the IP address to the main processing unit 903, along with the request.

In step S1206, the polling processing unit 902 determines whether it finishes the processing for all of the image forming apparatuses monitored by the monitoring apparatus 101. If the polling processing unit 902 determines in step S1206 that it finishes the processing for all of the apparatuses (YES in step S1206), then the processing proceeds to step S1207. In step S1207, the polling processing unit 902 waits for a predetermined time that is measured by the timer 506. After the predetermined time has passed, the processing returns to step S1201. In step S1201, the polling processing unit 902 starts the polling processing for the first image forming apparatus of the apparatuses monitored by the monitoring apparatus 101.

In step S1206, if the polling processing unit 902 has not yet finished the processing for all of the apparatuses (NO in step S1206), then the processing returns to step S1201. In step S1201, the polling processing unit 902 performs the polling processing for the next image forming apparatus monitored by the monitoring apparatus 101.

According to the present exemplary embodiment, even though the image forming apparatus does not especially notify the monitoring apparatus 101 of a loss of the registration information including the notification destination address and the notification condition(s), the monitoring apparatus 101 can detect that the registration information may be lost, by the polling processing that the monitoring apparatus 101 periodically performs.

As mentioned above, the polling processing should be performed in conjunction with a spontaneous notification of the status information by the image forming apparatus with use of the registration information, for preventing undermining of the integrity of the information of the image forming apparatus that should be monitored. In other words, according to the present exemplary embodiment, it becomes possible to appropriately re-register the lost registration information into the image forming apparatus without a special notification therefor.

A second exemplary embodiment of the present invention will now be described. The second exemplary embodiment performs a control such that the polling processing unit 902 requests re-registration of the registration information when it is considered that the image forming apparatus is turned off and then turned on.

Figure 13:
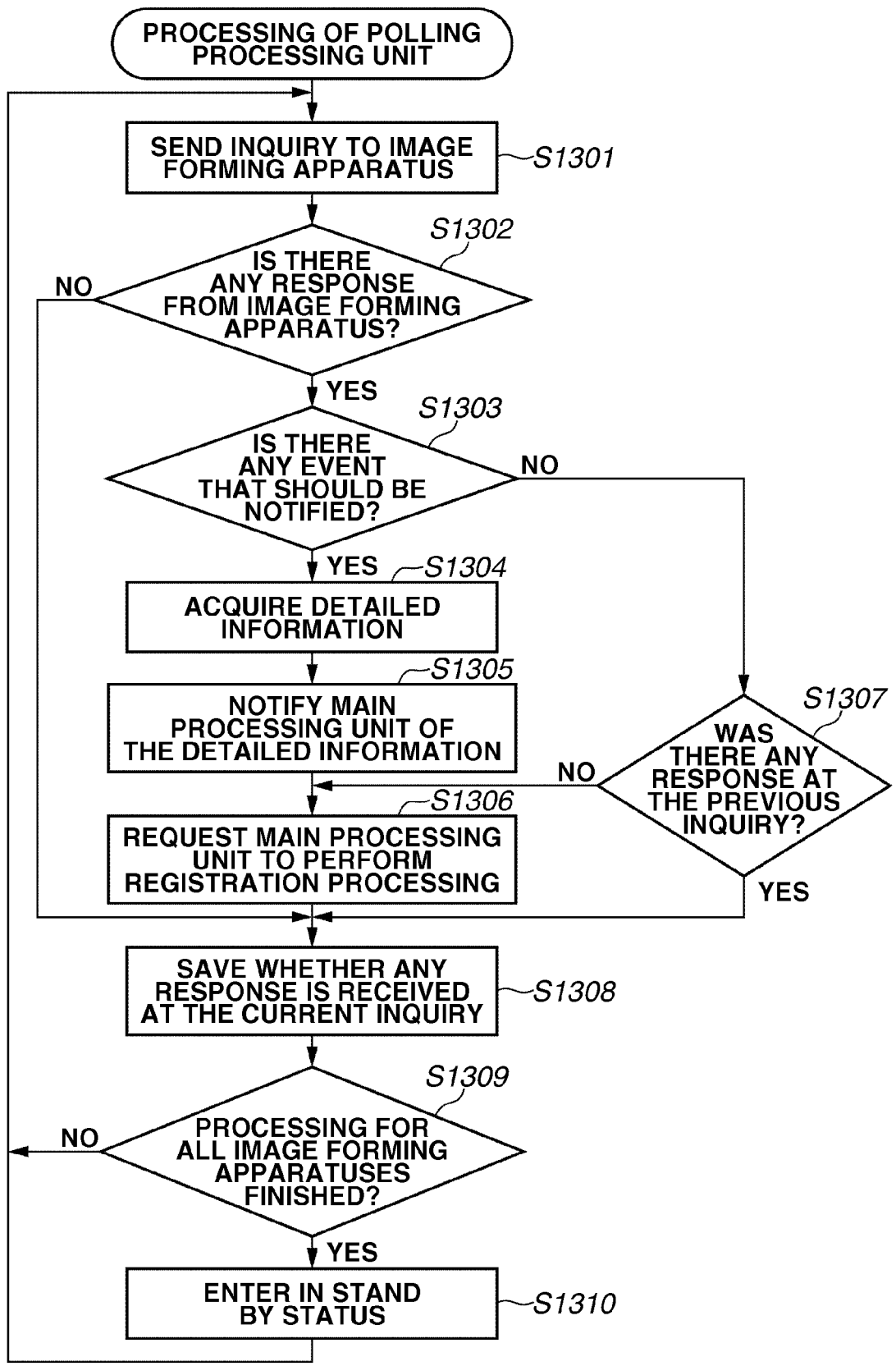
FIG. 13 is a flowchart illustrating processing of a polling processing unit in a second exemplary embodiment of the present invention.

FIG. 13 is a flowchart illustrating the operation of the polling processing unit 902.

In step S1301, the polling processing unit 902 performs the processing of S1201 as described in the first exemplary embodiment for any one of the image forming apparatuses monitored by the monitoring apparatus 101, and additionally performs the processing of saving whether there is any response from the image forming apparatus in the RAM 203. Here, it is assumed that absence of a response indicates a failure of the polling processing due to, for example, power-off of the image forming apparatus.

In step S1302, the polling processing unit 902 determines whether there is any response from the image forming apparatus in step S1301. If there is a response (YES in step S1302), the processing proceeds to step S1303. If there is no response (NO in step S1302), the processing proceeds to S1308.

In step S1303, the polling processing unit 902 performs the same determination processing as the processing performed in step S1202. If the polling processing unit 902 determines in step S1303 that there is an event that should be notified (YES in step S1303), then the processing proceeds to step S1304. If the polling processing unit 902 determines in step S1303 that there is no event that should be notified (NO in step S1303), then the processing proceeds to step S1307. In steps S1304 to S1306, the polling processing unit 902 performs the same processing as the processing performed in steps S1203 to S1205 described in the description of the first exemplary embodiment.

In step S1307, the polling processing unit 902 determines whether there was any response from the image forming apparatus in step S1301 of the previous polling processing. If the polling processing unit 902 determines that there was a response in the previous polling processing (YES in step S1307), then the processing proceeds to step S1308. If the polling processing unit 902 determines that there was no response in the previous polling processing (NO in step S1307), then the processing proceeds to step S1306. In step S1306, the polling processing unit 902 registers the registration information including the notification destination address and the notification condition(s) into the image forming apparatus.

In this case, it can be estimated that the image forming apparatus is newly turned on because the polling processing unit 902 couldn't acquire the information due to power-off of the image forming apparatus at the time of the previous polling processing, but can acquire the information in step S1301 at the current polling processing. That is, the polling processing unit 902 can detect that the image forming apparatus is turned on from the determination in step S1307 based on the success of the currently performed polling processing, and thereby the re-registration processing of the registration information can be performed for the image forming apparatus, the registration information of which has vanished due to power-off of the image processing apparatus.

In step S1308, the polling processing unit 902 saves whether or not it receives a response from the image forming apparatus to the inquiry performed in step S1301 in the current polling processing. More specifically, the polling processing unit 902 stores, in the storage unit 507, the information indicating whether there is a response from the image forming apparatus that was saved in the RAM 203 in step S1301. The information stored at this time is used in the determination processing in step S1307 in the next polling processing.

After that, in steps S1309 and S1310, the polling processing unit 902 performs the same processing as the processing in steps S1206 and S1207 described in the description of the first exemplary embodiment.

According to the present exemplary embodiment, it is possible to detect that the power of the image forming apparatus is switched from OFF to ON by saving presence or absence of a response from the image forming apparatus in the polling processing, and the monitoring apparatus 101 can re-register the registration information at the right moment.

A third exemplary embodiment of the present invention will now be described. The third exemplary embodiment performs a control in such a manner that the monitoring apparatus 101 stops the re-registration processing to the image forming apparatus.

Figure 14:
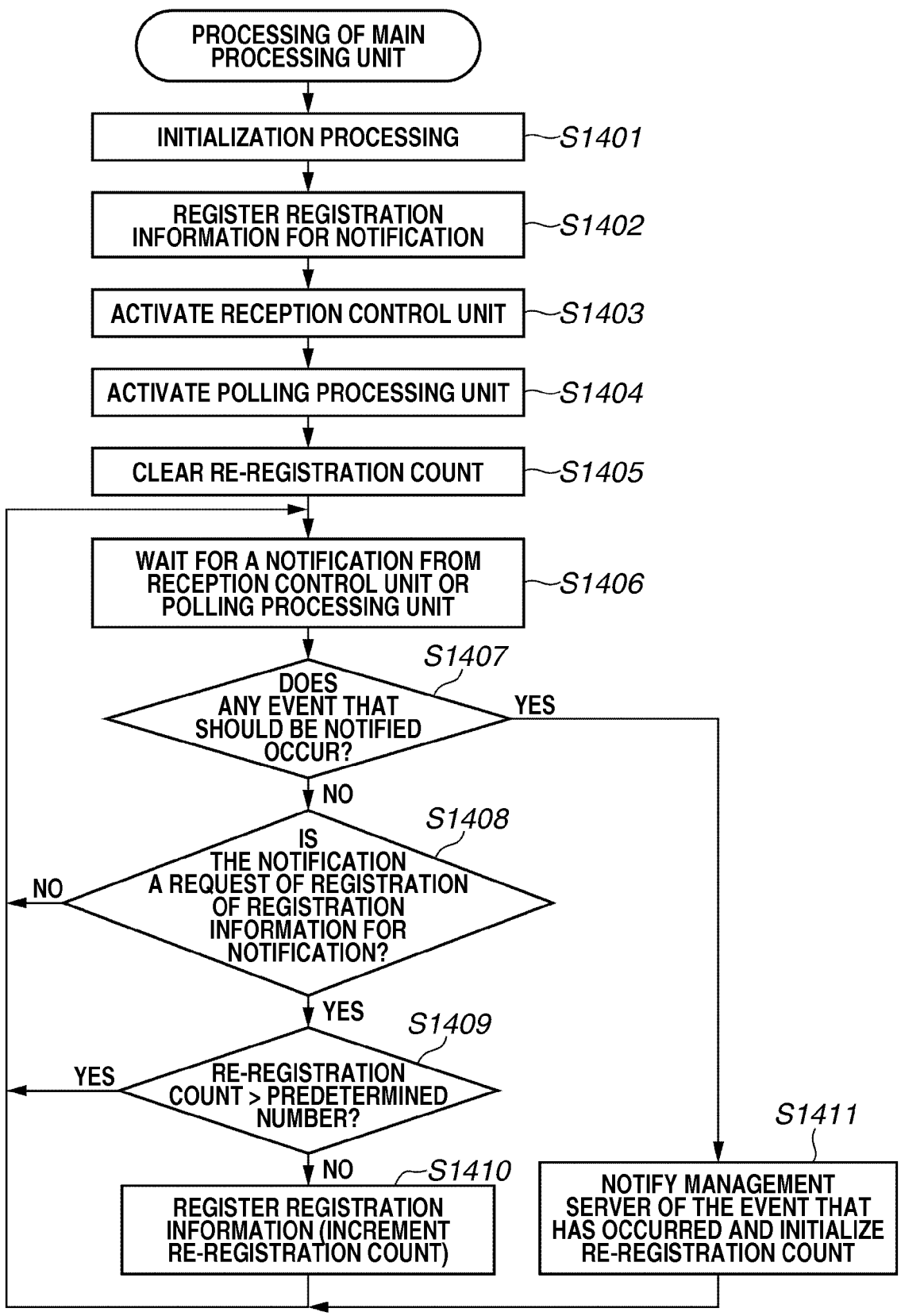
FIG. 14 is a flowchart illustrating processing of a main processing unit in a third exemplary embodiment of the present invention.

FIG. 14 is a flowchart illustrating the operation of the main processing unit 903. In steps S1401 to S1404, the main processing unit 903 performs the same processing as the processing performed in steps S1001 to S1004 described in the description of the first exemplary embodiment.

In step S1405, the main processing unit 903 initialize a re-registration count to zero. The re-registration count is stored so that it is associated with each image forming apparatus monitored by the monitoring apparatus 101, and indicates the number of times of consecutively performed re-registration processing. Then, the processing proceeds to steps S1406 to S1408, in which the unit 903 performs the same processing as the processing performed in steps S1005 to S1007 discussed in the description of the first exemplary embodiment.

In step S1407, if the main processing unit 903 determines based on the notification received in step S1406 that an event that should be notified to the management server 107 has occurred (YES in step S1407), then the processing proceeds to step S1411. In step S1411, the main processing unit 903 performs the same notification processing as the processing performed in step S1009, and then resets the re-registration count, which is stored so as to be associated with the notified image forming apparatus, to zero.

In step S1408, if the main processing unit 903 determines that the notification is a request for registration of the registration information (YES in step S1408), the processing proceeds to step S1409. In step S1409, unlike the first exemplary embodiment, the main processing unit 903 determines whether the re-registration count, which is stored so as to be associated with the image forming apparatus into which the unit 903 is requested to register the registration information, does not exceed a predetermined number of times.

In step S1409, if the main processing unit 903 determines that the re-registration count exceeds the predetermined number of times (YES in step S1409), then the unit 903 does not perform the registration processing of the registration information to the image forming apparatus, and the processing returns to step S1406. At this time, a warning indicating that the re-registration processing has been almost performed times equal to or more than the predetermined number of times may be issued to an administrator of the monitoring apparatus 101 or the management server 107.

On the other hand, in step S1409, if the main processing unit 903 determines that the re-registration count does not exceed the predetermined number of times (NO in step S1409), the processing proceeds to step S1410. In step S1410, the main processing unit 903 performs the registration processing in the same manner as step S1008, and increments, by 1, the re-registration count stored so as to be associated with the image forming apparatus to which the unit 903 performed the re-registration processing. After that, the processing returns to step S1406.

According to the present exemplary embodiment, it is possible to prevent that the monitoring apparatus 101 wastefully repeats the re-registration processing in vain when the image forming apparatus is currently in such a situation that the registration information cannot be re-registered thereto for some reason.

A fourth exemplary embodiment of the present invention will now be described. The fourth exemplary embodiment performs a control in consideration of the case where the polling processing unit 902 acquires the most recent status information of the image forming apparatus before the reception control unit 504 receives it.

Figure 15:
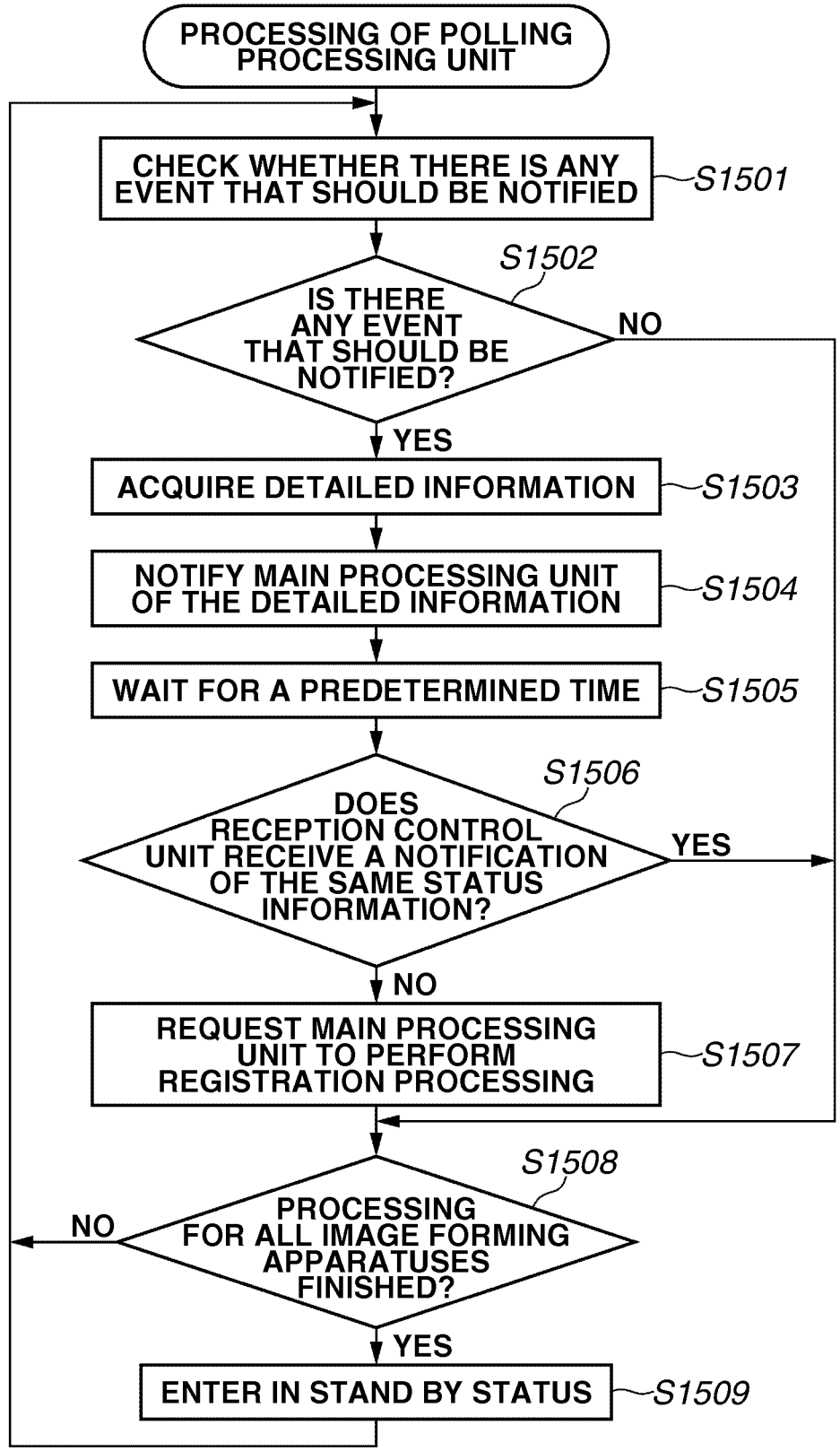
FIG. 15 is a flowchart illustrating processing of a polling processing unit in a fourth exemplary embodiment of the present invention.

FIG. 15 is a flowchart illustrating the operation of the polling processing unit 902. The flowchart of FIG. 15 is different from the flowchart of FIG. 12 described in the first exemplary embodiment in terms of S1505 and S1506 added to the flowchart of FIG. 15.

After notifying the main processing unit 903 of the acquired detailed information in steps S1501 to S1504, in step S1505, the polling processing unit 902 waits for a predetermined time. The predetermined time can be arbitrarily set by an administrator in consideration of, for example, a system policy. Generally, the predetermined time is set as several seconds.

After the predetermined time has passed, the polling processing unit 902 determines in step S1506 whether the reception control unit 504 receives a notification of the same status information as the information acquired in steps S1501 to S1503. If the polling processing unit 902 determines in step S1506 that a notification of the same content is not transmitted from the image forming apparatus to the reception control unit 504 (NO in step S1506), the processing proceeds to step 1507, in which the unit 902 requests the main processing unit 903 to perform the registration processing to the image forming apparatus.

According to the present exemplary embodiment, even when the polling processing unit 902 acquires an event of the image forming apparatus that should be notified, the polling processing unit 902 does not immediately request the main processing unit 903 to re-register the registration information into the image forming apparatus, but waits to determine whether the reception control unit 504 receives a notification of the same content. Therefore, it is possible to prevent that the main processing unit 903 wastefully performs the re-registration processing when the registration information is not lost at the image forming apparatus.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-175394 filed Jul. 28, 2009, which is hereby incorporated by reference herein in its entirety.

What is claimed is:

1. A monitoring apparatus for monitoring an image forming apparatus, comprising:
    a memory device;
    a registration unit configured to register address information of the monitoring apparatus into the image forming apparatus;
    a reception unit configured to, according to an occurrence of an event at the image forming apparatus, receive from the image forming apparatus a notification of information regarding the event that has occurred, the notification being sent using the registered address information;
    a storing unit configured to store the information regarding the event that has occurred at the image forming apparatus in the memory device based on the received notification;
    an acquisition unit configured to acquire the information by periodically inquiring to the image forming apparatus; and
    a determination unit configured to determine whether the acquired information is stored in the memory device,
    wherein, if the information is not stored in the memory device, the registration unit re-registers the address information, and
    wherein the information stored in the memory device and the information used in the determination of the determination unit are changed according to a method by which the image forming apparatus stores the event that has occurred at the image forming apparatus.

2. The monitoring apparatus according to claim 1, wherein, if the image forming apparatus sequentially stores a plurality of events that have occurred at the image forming apparatus,
    the storing unit stores a first reference information in the memory device as the information regarding the event that has occurred at the image forming apparatus, the first reference information indicating to which event of the plurality of events has been notified,
    the acquisition unit acquires a second reference information as the information regarding the event that has occurred at the image forming apparatus, the second reference information indicating an event that the image forming apparatus has stored most recently, and
    the determination unit determines that the second reference information is not stored in the memory device, if the acquired second reference information does not match the first reference information.

3. The monitoring apparatus according to claim 1, further comprising a saving unit configured to save information indicating whether there is any response from the image forming apparatus at the time of the acquisition,
    wherein, regarding the inquiry periodically performed, when the acquisition unit acquires the information in response to the current inquiry, as a result of a reference to the saved information, if there was no response according to the previous inquiry, the registration unit re-registers the address information.

4. The monitoring apparatus according to claim 1, further comprising a retention unit configured to retain a count of re-registration of the address information, wherein, if the count of re-registration exceeds a predetermined number of times, even if the information is not stored in the memory device, the registration unit does not re-register the address information; or if the count of re-registration does not exceed the predetermined number of times, and the information is not stored in the memory device, the registration unit re-registers the address information.

5. The monitoring apparatus according to claim 1, wherein, if the information is not stored in the memory device, if the reception unit does not still receive the information, even after a predetermined time has passed, the registration unit re-registers the address information.

6. The monitoring apparatus according to claim 1, wherein the monitoring apparatus is connected to a management server configured to manage the image forming apparatus through the monitoring apparatus; and
the event is notified to the management server.

7. The monitoring apparatus according to claim 1, wherein the event includes at least any one of an error and a jam.

8. A method performed by a monitoring apparatus, including a memory device, for monitoring an image forming apparatus, the method comprising:
registering address information of the monitoring apparatus into the image forming apparatus;
receiving, according to an occurrence of an event at the image forming apparatus, a notification of information regarding the event that has occurred from the image forming apparatus, the notification being sent with use of the registered address information;
storing, in the memory device, the information based on the received notification;
acquiring the information by periodically inquiring to the image forming apparatus;
determining whether the acquired information is stored in the memory device; and
re-registering the address information if the acquired information is not stored in the memory device,
wherein the information stored in the memory device and the information used in the determination are changed according to a method by which the image forming apparatus stores the event that has occurred at the image forming apparatus.

9. The method according to claim 8, further comprising:
saving information indicating whether there is any response from the image forming apparatus at the time of the acquisition; and
re-registering the address information if there is no response from the image forming apparatus according to a previous inquiry.

10. The method according to claim 8, further comprising:
retaining a count of re-registration of the address information; and
re-registering the address information if the count of re-registration does not exceed the predetermined number of times, and the information is not stored in the memory device.

11. The method according to claim 8, further comprising re-registering the address information if the information is not stored in the memory device, if the reception unit does not still receive the information, even after a predetermined time has passed.

12. The method according to claim 8, further comprising:
managing by a management server connected to the monitor apparatus; and
notifying the event to the management server.

13. A computer readable storage medium storing a computer program for causing a computer to execute a method for monitoring an image forming apparatus, the method comprising:
registering address information of a monitoring apparatus into the image forming apparatus;
receiving, according to an occurrence of an event at the image forming apparatus, a notification of information regarding the event that has occurred from the image forming apparatus, the notification being sent with use of the registered address information;
storing, in the memory device, the information based on the received notification;
acquiring the information by periodically inquiring to the image forming apparatus;
determining whether the acquired information is stored in the memory device; and
re-registering the address information if the acquired information is not stored in the memory device,
wherein the information stored in the memory device and the information used in the determination are changed according to a method by which the image forming apparatus stores the event that has occurred at the image forming apparatus.

14. The computer readable storage medium according to claim 13, further comprising:
saving information indicating whether there is any response from the image forming apparatus at the time of the acquisition; and
re-registering the address information if there is no response from the image forming apparatus according to a previous inquiry.

15. The computer readable storage medium according to claim 13, further comprising:
retaining a count of re-registration of the address information; and
re-registering the address information if the count of re-registration does not exceed the predetermined number of times, and the information is not stored in the memory device.

16. The computer readable storage medium according to claim 13, further comprising re-registering the address information if the information is not stored in the memory device, if the reception unit does not still receive the information, even after a predetermined time has passed.

17. The computer readable storage medium according to claim 13, further comprising:
managing by a management server connected to the monitor apparatus; and
notifying the event to the management server.

* * * * *